ｃ(12) United States Patent
Vialen et al.

(10) Patent No.: US 7,577,256 B2
(45) Date of Patent: *Aug. 18, 2009

(54) COUNTER INITIALIZATION, PARTICULARLY FOR RADIO FRAMES

(75) Inventors: Jukka Vialen, Espoo (FI); Valtteri Niemi, Helsinki (FI)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/855,208

(22) Filed: Sep. 14, 2007

(65) Prior Publication Data

US 2008/0013729 A1    Jan. 17, 2008

Related U.S. Application Data

(63) Continuation of application No. 10/231,364, filed on Aug. 30, 2002, now Pat. No. 7,289,630, which is a continuation of application No. PCT/FI01/00202, filed on Feb. 28, 2001.

(30) Foreign Application Priority Data

Mar. 1, 2000    (FI)    ................................... 20000479
May 5, 2000    (FI)    ................................... 20001052

(51) Int. Cl.
   *H04K 1/00*    (2006.01)
(52) U.S. Cl. ..................................................... 380/274
(58) Field of Classification Search ................. 380/274, 380/271
See application file for complete search history.

(56) References Cited

U.S. PATENT DOCUMENTS 5,293,423 A    3/1994    Dahlin et al.

(Continued)

FOREIGN PATENT DOCUMENTS

DE    19756587    1/1999

(Continued)

OTHER PUBLICATIONS

Horn et al, "Review of third generation mobile system security architecture." ISEE. [http://www.isrc.rhul.ac.uk/useca/OtherPublications/isse00.pdf].

(Continued)

*Primary Examiner*—Kambiz Zand
*Assistant Examiner*—Jason K Gee
(74) *Attorney, Agent, or Firm*—Charles D. Brown; Won Tae C Kim

(57) ABSTRACT

A method for protecting traffic in a radio access network connected to at least two core networks. The method comprises maintaining a core-network-specific authentication protocol and a radio-bearer-specific ciphering process, and generating, for each ciphering process, a count parameter comprising a cyclical sequence number and a hyperframe number (HFN) which is incremented each time the cyclical sequence number completes one cycle. For each core network or authentication protocol, a first radio bearer of a session is initialized with a HFN exceeding the highest HFN used during the previous session. When a new radio bearer is established, the mobile station selects the highest HFN used during the session for the core network in question, increments it and uses it for initializing the count parameter for the new radio bearer. At the end of a session, the mobile station stores at least part of the highest HFN used during the session.

15 Claims, 2 Drawing Sheets

U.S. PATENT DOCUMENTS

| | | |
|---|---|---|
| 5,457,737 A | 10/1995 | Wen |
| 5,477,541 A | 12/1995 | White et al. |
| 5,784,462 A | 7/1998 | Tomida et al. |
| 5,822,681 A | 10/1998 | Chang et al. |
| 5,839,071 A | 11/1998 | Johnson |
| 5,940,380 A | 8/1999 | Poon et al. |
| 5,966,450 A | 10/1999 | Hosford et al. |
| 6,097,817 A | 8/2000 | Bilgic et al. |
| 6,377,557 B1 | 4/2002 | Ohlson et al. |
| 6,545,996 B1 | 4/2003 | Falco et al. |
| 6,728,549 B1 | 4/2004 | Guerard et al. |
| 6,842,445 B2 | 1/2005 | Ahmavaara et al. |
| 6,882,727 B1 | 4/2005 | Vialen et al. |
| 6,925,298 B2 | 8/2005 | Ho |
| 6,968,200 B2 | 11/2005 | Kuo |
| 7,020,455 B2 | 3/2006 | Krishnarajah et al. |
| 7,085,294 B2 | 8/2006 | Longoni et al. |
| 7,197,145 B2 | 3/2007 | Yi |
| 7,227,857 B2 | 6/2007 | Kuo |
| 7,289,630 B2 * | 10/2007 | Vialen et al. ............ 380/201 |

FOREIGN PATENT DOCUMENTS

| | | |
|---|---|---|
| EP | 0714180 | 5/1996 |
| FR | 2682247 | 4/1991 |
| WO | 9712461 | 4/1997 |
| WO | 9747111 | 12/1997 |
| WO | 9939525 | 8/1999 |
| WO | 0036860 | 6/2000 |

OTHER PUBLICATIONS

Horn et al, "Towards a UMTS security architecture." ITG. [http://www.isrc.rhul.ac.uk/useca/OtherPublications/eurowire99.pdf].

International Search Report—PCT/FI01/000202, International Search Authority—Swedish Patent Office.

International Preliminary Examination Report—PCT/FI01/000202, IPEA—SE, May 27, 2002.

* cited by examiner

US 7,577,256 B2

COUNTER INITIALIZATION, PARTICULARLY FOR RADIO FRAMES

This is a continuation of U.S. patent application Ser. No. 10/231,364, filed on Aug. 30, 2002, which is a continuation of International Application No. PCT/FI01/00202, filed Feb. 28, 2001, which, in turn, relies for priority upon Finnish Patent Application No. 20000479, filed Mar. 1, 2000, and Finnish Patent Application No. 20001052, filed May 5, 2000, the contents of all of which are incorporated herein by reference in their entireties.

FIELD OF THE INVENTION

The invention relates to initialization of counters which are used as time varying input parameters for security functions, such as ciphering and/or integrity protection. The invention is particularly useful in wireless communication systems in which one radio access network can be connected to several core networks.

BACKGROUND OF THE INVENTION

Wireless communications systems refer generally to any telecommunications systems which enable wireless communication between the users and the network. In mobile communications systems, users are able to move within the coverage area of the network. A typical mobile communications system is a public land mobile network (PLMN). The present invention can be used in different mobile communications systems, such as the Universal Mobile Communications system (UMTS) and the IMT-2000 (International Mobile Telecommunication 2000). In the following, the invention is described by way of example with reference to the UMTS, more specifically to the UMTS system being specified in the third generation partnership project 3GPP, without restricting the invention to it.

In systems using encryption, a number based on a radio frame or on a protocol PDU (packet data unit) sequence is often used as a constantly varying input to a ciphering algorithm. In some documents, the radio frame-based number is called a Connection Frame Number (CFN). However, a connection frame number or a PDU sequence number (used for retransmission purposes and the like) by itself is too short for reliable ciphering. In many radio systems, such as the UTRAN (UMTS Terrestrial Radio Access Network) in the 3GPP project, ciphering is employed in the radio access network (RAN) between a terminal and a network node, such as a Radio Network Controller RNC. In addition to the CFN or PDU number and the actual cipher key, the ciphering algorithm may use other inputs, such as the direction of the transmission and/or the radio bearer used in the transmission.

Typically a frame number extension (a "hyper-frame number", HFN) is introduced which is stepped (typically incremented) when the short number (the CFN or the PDU sequence number) completes one period. The HFN together with the short number form an actual input (called a count parameter) to the ciphering algorithm. The purpose of the count parameter is to ensure that the same ciphering mask is not produced within too short a period of time. If (re)authentication and key change is performed, the count parameter (together with the HFN) can be reset to zero. Between two consecutive connections, the terminal stores the HFN into a non-volatile memory, such as the USIM (UMTS Subscriber Identity Module) in third generation user equipment (MS).

A similar input parameter, called COUNT-I in the 3GPP specifications, is required for the integrity protection algorithm to prevent replays during a connection. (A replay is an attempt to disrupt communication integrity by capturing and re-sending data packets or radio frames.) The COUNT-I parameter is also initialized with the HFN and incremented for each transmitted integrity-protected message.

FIG. 1 illustrates a situation in which one radio access network RAN is connected to two (or more) core networks CN. There is a circuit-switched core network CS-CN and a packet-switched core network PS-CN.

The approach described above is sufficient if the RAN is connected to one core network only. A network architecture having multiple core networks may involve a hard-to-detect problem which will be described later. For example, a UTRAN radio access network can be connected to a circuit-switched core network CS-CN and a packet-switched core network PS-CN. The circuit-switched core network CS-CN comprises a Mobile services Switching Centre/Visitor Location Register MSC/VLR. The packet-switched core network PS-CN comprises a Serving GPRS Support Node SGSN.

The following description makes use of the terms 'user plane' and 'control plane'. All information sent and received by the mobile station user, such as coded voice in a voice call or packets of an Internet connection, are transported on the user plane. The control plane is used for all UMTS-specific control signalling, which is normally not directly visible to the user. Some exceptions may exist, for example user-produced short messages can be sent on the control plane. In the radio interface, data from the user plane and control plane can be multiplexed onto the same physical channel.

Let us first assume that the USIM establishes cipher keys with both the CS and the PS core network domains. On the user plane, the user data connections towards the CS service domain are ciphered with a cipher key $CK_{CS}$ that is established between a mobile station (MS) user and the CS core network service domain, and identified in the security mode setting procedure between the UTRAN and the mobile station. The user data connections towards the PS service domain are ciphered with the cipher key $CK_{PS}$ that is established between the user and the PS core network service domain, and identified in the security mode setting procedure between the UTRAN and the MS. The ciphering process is illustrated in FIG. 2. In this example, the input parameters to the ciphering algorithm f8 are the Cipher Key CK, a time dependent count parameter C, the bearer identity B, the direction of transmission D and the length L of the keystream required. Based on these input parameters (CK, C, B, D, L), the algorithm generates an output keystream block which is used to encrypt the input plaintext block PB. The result of the encryption process is a ciphertext block CB.

As shown in FIG. 3, another key is needed on the control plane, in addition to the cipher key CK. This key is called an integrity key IK. The integrity key is used as an input to an integrity protection function f9, which calculates a Message Authentication Code MAC-I to be appended to signalling messages. FIG. 3 illustrates the calculation of the MAC-I code(s) both on the sender side and on the receiver side. Besides the integrity key IK, some other parameters are used to calculate the message authentication code. COUNT-I is a time varying counter, which is basically similar to the count parameter C shown in FIG. 2 (and which will be described in more detail in connection with FIG. 4). A preferred implementation of the COUNT-I parameter is the hyperframe number HFN combined with a signalling message sequence number. The direction bit D has been described in connection with FIG. 2. The UTRAN provides a random value F called "fresh". Other inputs are the radio bearer ID and the actual message M whose integrity is to be protected. In the implementation shown in FIG. 3, the radio bearer ID is included in one of the other input parameters, for example in the message M. The hyperframe number for integrity protection (HFN-I) may be separate from the hyperframe number used for ciphering (HFN-C). A calculated message authentication code MAC is needed to verify the origin of signalling messages. When a security mode setting procedure between the UTRAN and the MS is performed, the cipher/integrity keys set by this procedure are applied to the control plane, whatever core network service domain is specified in the procedure. This may require that the cipher and/or integrity keys of an (already ciphered and/or integrity protected) ongoing signalling connection (control plane connection) be changed.

An issue to be observed is that the count parameter C should never repeat unless some of the other parameters to the algorithm have changed. This is especially critical to ciphering, but it is also necessary for integrity protection. As the HFN is used to initialize the count, the HFN value stored in the USIM should never decrease unless the key with which the HFN was used is changed. If the stored HFN is common to both the CS domain and the PS domain, there is a possibility that HFN values (and thus the count parameters) are reused with same ciphering (and integrity) key. This problem can be illustrated by the following example.

Let us assume that an MS user establishes first a connection with a circuit-switched (CS) service domain and obtains a key set (ciphering and integrity keys, CK+IK) during an authentication procedure. The user plane radio bearer utilizes the $CK_{CS}$ and the control plane signalling radio bearer utilizes $CK_{CS}$ and $IK_{CS}$. Three HFNs are initialized:

1) HFN-$C_{UP1}$ (HFN for Ciphering User Plane bearer number one);
2) HFN-$C_{CP1}$ (HFN for Ciphering Control Plane bearer number one);
3) HFN-I (HFN for integrity protection on the control plane).

In practice, the uplink and downlink directions in each radio bearer may require separate hyperframe numbers. In other words, there may be as many as six separate HFNs, but this is not relevant to describing the problem. More than one HFN-$C_{UP}$ and HFN-$C_{CP}$ can exist, but in this example only one user plane and one control plane radio bearer is assumed. Separate initialization values for the HFN-C and the HFN-I can be read from the USIM. For simplicity, let us assume in this example that all the hyperframe numbers start from zero.

Next, the connection is released. One HFN-C and one HFN-I (the highest ones used during the connection) are stored into the USIM. For example, let us assume a value of 1000 for the HFN-C and HFN-I. Furthermore, the ciphering key $CK_{CS}$ for the CS domain and the integrity key $IK_{CS}$ remain in the memory of the MS for possible future use.

Next, a connection to the packet-switched (PS) service domain is established. The HFN-C for ciphering and the HFN-I for integrity protection are read from the USIM and transmitted to the UTRAN. A potential residual problem is that the hyperframe numbers in the USIM are related to the CS domain connection but are now to be used for the connection in the PS domain. Assuming that an authentication procedure (and a key change) is executed with the PS domain, the problem appears to be solved, since the hyperframe numbers HFN-I and HFN-C are reset to zero after authentication. However, let us continue our example and assume that during this PS connection, after authentication and key change, the HFN values increase only as high as 500. When the PS connection is released, this value is stored into the USIM.

Finally, a new connection is established to the CS domain. Assuming that this time no authentication is performed at the beginning of the connection, the old ciphering key $CK_{CS}$ and integrity key $IK_{CS}$ are taken into use, with the HFN values read from the USIM. A consequence is that HFN values of 501 to 1000 with $CK_{CS}$ would be reused, which may compromise data security.

SUMMARY OF THE INVENTION

The object of the invention is to solve the above-described problem relating to possible re-use of the hyperframe numbers. This object is achieved with a method and equipment which are characterized by what is disclosed in the attached independent claims. Preferred embodiments of the invention are disclosed in the attached dependent claims.

The invention is based on finding the hard-to-detect problem and creating a solution for it. The problem can be solved by associating the hyperframe number with the core network domain (or with the authentication protocol, in practice with mobility management). According to this solution, taking the UTRAN as an example, two HFNs are specified, an HFN-CS and an HFN-PS. If more than two CN domains with independent authentication protocols are used, then also more hyperframe numbers are required, one for each CN domain. When authentication and key change is executed with the CS service domain, the HFN-CS is reset to zero. Likewise, when authentication and key change is executed with the PS service domain, the HFN-PS is reset to zero. This also requires that both hyperframe numbers (the HFN-CS and the HFN-PS) be stored into the USIM (together with ciphering and integrity keys for both domains) each time a connection is released. The actual HFN value to be stored is selected by comparing the count parameters C in each radio bearer belonging to this CN domain (the CN in which the connection is being released) and selecting the highest one. If the keys for signalling bearers are from this CN domain, the COUNT-I is also included in this comparison. When a new connection is set up with either of the CN domains, the corresponding hyperframe number is read from the USIM and transmitted to the UTRAN, in an RRC message on a RACH channel or on a dedicated channel. Alternatively, both hyperframe numbers (the HFN-CS and HFN-PS) can be read from the USIM and transmitted to the UTRAN simultaneously. This may be necessary, since at this stage, the mobile station does not always know to which core network the connection is actually being set up.

A hyperframe number HFN for a new radio bearer will be based on the highest HFN used during the connection for the CN domain in question. The new HFN will be set to the value of the highest used HFN (for the CN domain in question) incremented by some integer value, preferably by one.

It is possible to avoid producing the same ciphering mask within too short a period of time a) by including a bearer-specific or logical channel-specific input (for example, a bearer-id number) in the inputs of the ciphering algorithm (as disclosed in co-assigned Finnish patent application 990500) or b) by using a different CK or a different ciphering algorithm for each parallel radio access bearer (as disclosed in co-assigned Finnish patent application 980209).

According to a preferred embodiment of the invention, the highest used HFN value for each CN domain where the MS has had radio bearer connections during an RRC connection, is stored in the mobile station's SIM card after releasing the RRC connection. When the next new RRC connection is established, the MS sends the serving radio network controller SRNC an initialization value which enables the SRNC to initialize its ciphering and/or integrity protection algorithms identically. The initialization value is based on the HFN associated with the CN domain which has initialized the RRC connection establishment. On the basis of the initialization value, the SRNC initializes the HFN to a value which is higher than the highest used HFN. Since the HFN has a finite length, "higher" should be interpreted in a modulo fashion. For example, let us assume a length of 25 bits for the HFN. Some memory can be saved and the connection establishment messages can be shortened by storing and sending only the most significant bits of the HFN. For example, the MS could store only the eight most significant bits. Let us call these eight bits the MSB part of the HFN. In the next connection establishment, the 17 least significant bits (the LSB part) will not be known. However, if the MSB part is incremented by one (between two consecutive RRC connections), the first HFN of the new connection will certainly be higher than the last HFN of the previous connection. An identical result is achieved if all bits in the LSB part are assumed to be ones and the entire HFN (not just the MSB part) is incremented by one.

BRIEF DESCRIPTION OF THE DRAWINGS

The invention will be described in more detail by means of preferred embodiments with reference to the appended drawings wherein.

DETAILED DESCRIPTION OF THE INVENTION

Figure 1:
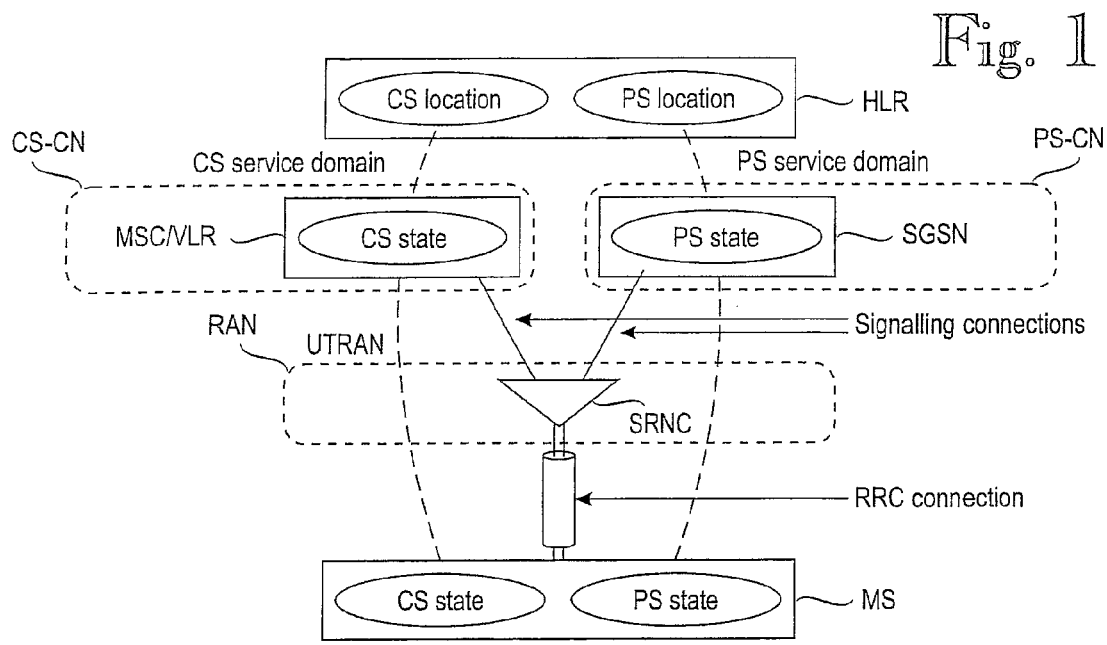
FIG. 1 is a block diagram illustrating a telecommunications system comprising a radio access network and two core network or service domains.

FIG. 1 is a conceptual-level block diagram illustrating a telecommunications system in which the invention can be used. The system comprises a radio access network UTRAN, which in turn comprises a serving radio network controller SRNC. FIG. 1 also shows two core networks (also called service domains), namely a circuit-switched core network CS-CN and a packet-switched core network PS-CN. The mobile station MS maintains separate state variables for each core network. Similarly, the home location register HLR maintains separate rights and location information for both service domains of the mobile station.

Figure 2:
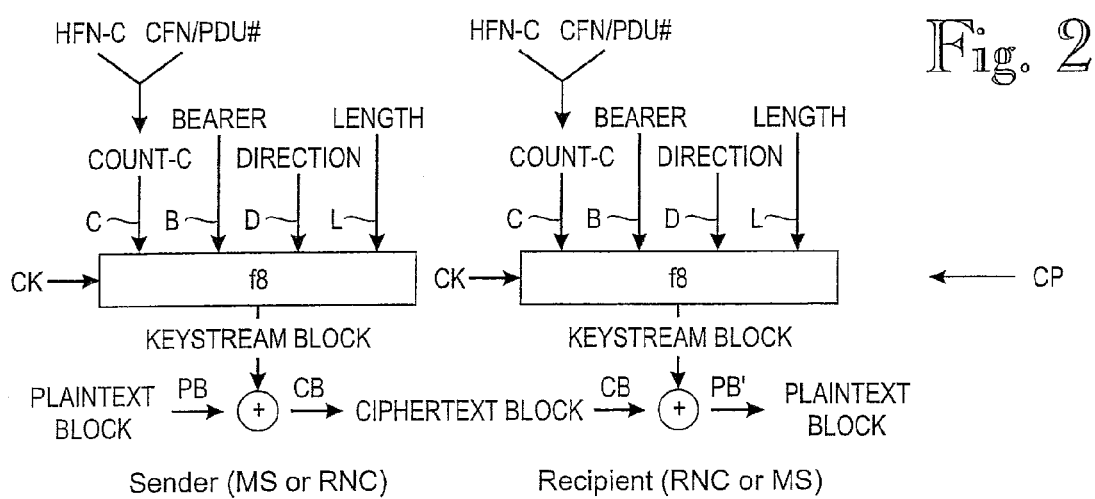
FIG. 2 illustrates ciphering.
Figure 3:
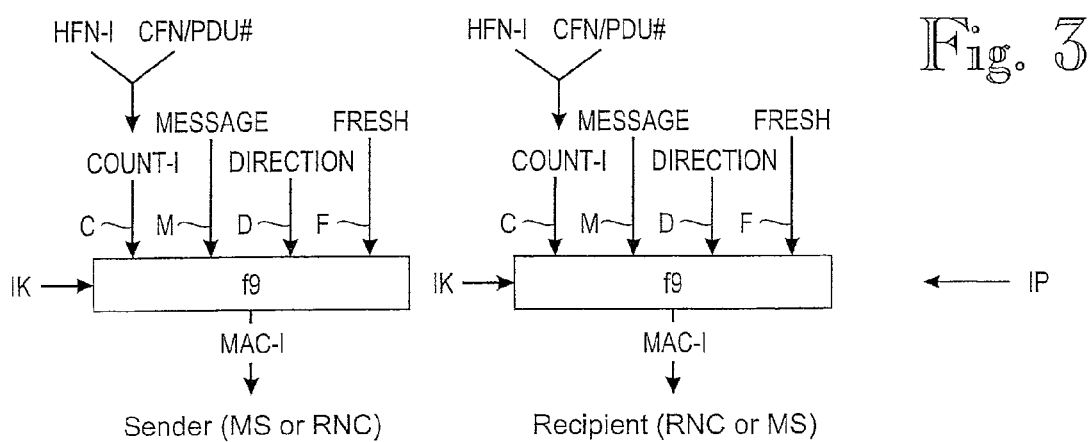
FIG. 3 illustrates integrity protection.

FIG. 2 illustrates the ciphering process CP used in an UMTS system. Let us first assume that the USIM establishes cipher keys with both the CS and the PS core network domains. On the user plane, the user data connections towards the CS service domain are ciphered with a cipher key $CK_{CS}$ that is established between a mobile station (MS) user and the CS core network service domain, and identified in the security mode setting procedure between the UTRAN and the mobile station. The user data connections towards the PS service domain are ciphered with the cipher key $CK_{PS}$ that is established between the user and the PS core network service domain, and identified in the security mode setting procedure between the UTRAN and the MS. In this example, the ciphering algorithm f8 uses five input parameters, namely CK, C, B, D and L. The cipher key CK is established for each session. C is a time-dependent input count parameter, which will be shown in more detail in FIG. 4. B is the identity of the radio bearer in question. D is the direction of transmission (up/down). L is the length of the keystream required. Based on these input parameters, the f8 algorithm generates an output key-stream block which is used to encrypt the input plaintext block PB. The result of the encryption process is a ciphertext block CB. In FIGS. 2 and 3, a departure from prior art is the fact that the hyperframe numbers for ciphering and/or integrity protection, HFN-C and HFN-I, are maintained separately for each core network.

Figure 4:
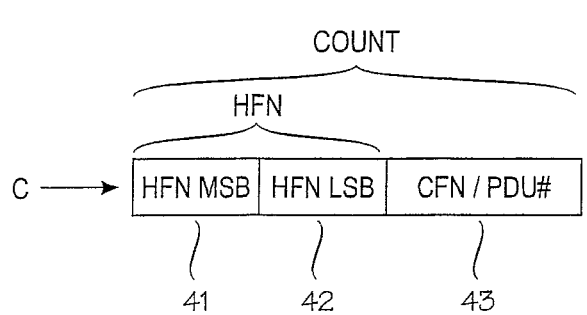
FIG. 4 illustrates the count parameter used for ciphering and/or integrity protection.

FIG. 4 illustrates the count parameter C used for ciphering and/or integrity protection. The most significant bits (MSB) are on the left. The count parameter comprises a cyclical least significant part 43, which can be the connection-specific frame number CFN (if encryption is carried out on a protocol layer which is able to 'follow' the CFN, e.g. the Medium Access Control (MAC) layer) or a PDU number PDU# (if encryption is carried out on a protocol layer using PDU numbers, e.g. Radio Link Control (RLC) layer). Additionally, the count parameter comprises a hyperframe number HFN which is incremented when the cyclical part 43 completes one cycle. In this context, "cyclical" means that the cyclical part 43 completes many cycles during a connection, whereas the entire count parameter C is so long that repeated values are not produced during a typical connection, or at least during a lifetime of one ciphering/integrity key. The entire HFN (along with the cyclical part 43) is used for ciphering and/or integrity protection, but the HFN is divided into an MSB part 41 and an LSB part 42. Some memory is saved if only the MSB part is stored between sessions.

Figure 5:
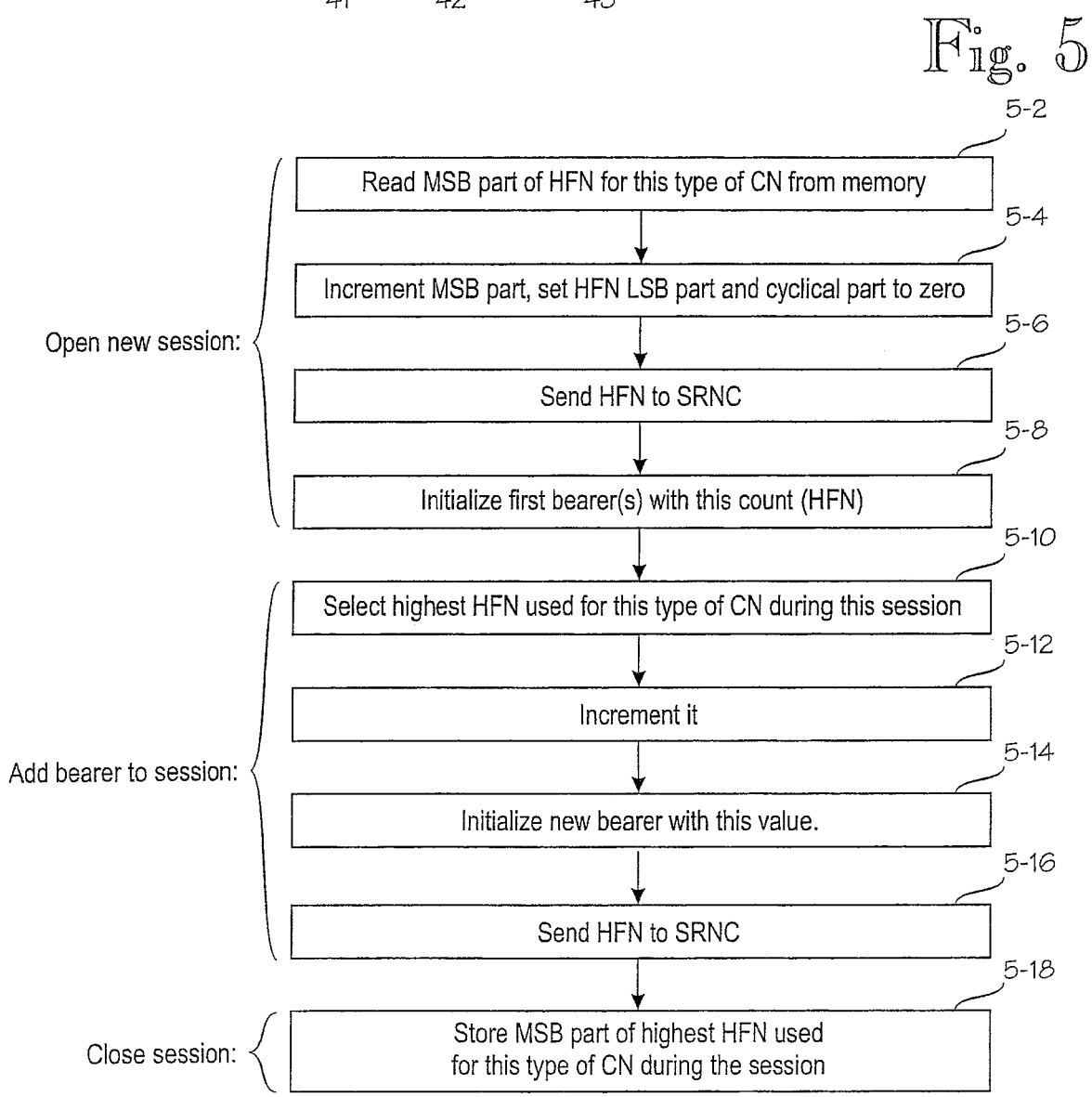
FIG. 5 illustrates maintenance of the hyperframe numbers in a mobile station.

FIG. 5 illustrates maintenance of the hyperframe numbers in a mobile station. FIG. 5 shows three major phases: opening a new session, adding a new bearer to an existing session and closing a session. Opening a new session comprises steps 5-2 through 5-8. In step 5-2, the mobile station reads from its memory (preferably, its SIM card), the MSB part 41 of the hyperframe number HFN for the core network in question (circuit-switched or packet-switched). In another embodiment of the invention, the mobile station reads in step 5-2 the MSB part of all the hyper frame numbers, i.e. for each core network the mobile station is able to connect to. This is needed at least if the mobile station does not know at this phase to which core network a connection is being established. In step 5-4, the MS increments the MSB part of the HFN and fills the LSB part with zeros. Incrementing the MSB part ensures that no values of the count parameter will be repeated (until the HFN overflows, which takes a very long time). Filling the remaining parts 42 and 43 with zeros maximizes the time until the HFN overflows, although in practice, any value will do, as long as both ends use the same value. In step 5-6, the MS sends the HFN to the serving radio network controller SRNC. In the second embodiment, the MS sends, in step 5-6, all HFNs (one for each core network) to the SRNC. Alternatively, the MS can send only the MSB part 41, in which case the SRNC initializes the remaining parts 42 and 43 with the same values (eg ones) as the mobile station does. In step 5-8, the mobile station and the SRNC initialize first bearer with the count parameter. Alternatively, they may establish several bearers simultaneously using the same initial count parameter.

Steps 5-10 through 5-14 relate to adding a new bearer to an existing session. In step 5-10, the MS selects the highest hyperframe number used during this session for this type of core network (circuit-switched or packet-switched). In step 5-12, the selected hyperframe number is incremented. In step 5-14, the new bearer is initialized with this HFN value. In step 5-16, the MS sends the HFN to the serving radio network controller SRNC (similarly to step 5-6). Step 5-18 relates to closing a session. The mobile station stores into its memory the MSB part 41 of the highest HFN used for this type of core network during the session. This value will be used in step 5-2 when the next session is opened.

Although it is natural to increment the count parameter C, an identical result is obtained if the count parameter is decremented, in which case words like "higher/highest" must be replaced with "lower/lowest", etc. Because the HFN has a finite length, words like "higher/highest" etc. must be interpreted in a modulo-N manner, where N is the bit length of the count parameter. In other words, a very small value is "higher" than a value which is slightly less than $2^N$. It should also be understood that the term "hyperframe. number" is not to be interpreted strictly as an extension to a (radio) frame number, but It can also be an extension of a packet data unit.

Acronyms (Some are Not Official)
C: ciphering
CK: cipher key
CN: core network
CS: circuit-switched
GPRS: general packet radio service
HFN: hyperframe number
I: integrity (protection)
MS: mobile station
MSC: mobile services switching centre
PDU: packet data unit
PS: packet-switched
RAN: radio access network
RNC: radio network controller
SGSN: serving GPRS Support Node
SRNC: serving RNC
UMTS: universal mobile communications system
VLR: visitor location register

The invention claimed is:

1. A method for protecting traffic in a radio access network supporting multiple radio bearers to/from a terminal, the radio access network being connected to at least two core networks;
the method comprising:
maintaining a core network-specific authentication protocol;
maintaining a radio bearer-specific ciphering process;
generating, for each ciphering process, a count parameter comprising a cyclical sequence number and a hyperframe number which is incremented each time the cyclical sequence number completes one cycle; and
for each core network or authentication protocol:
initializing a first radio bearer of a session with a hyperframe number exceeding the highest hyperframe number used during the previous session; and
at the end of a session, storing at least part of the highest hyperframe number used during the session.

2. A method according to claim 1, further comprising adding a new radio bearer to an existing session by selecting the highest one of the hyperframe numbers used during the session for the core network in question, incrementing the selected hyperframe number and using it for initializing the count parameter for the new radio bearer.

3. A method according to claim 1, further comprising initializing, at the same time, more than one bearer with the same hyperframe number.

4. A method according to claim 1, wherein the cyclical sequence number comprises a connection-specific frame number.

5. A method according to claim 1, wherein the cyclical sequence number comprises a packet data unit number.

6. A terminal apparatus comprising:
means for performing a core network-specific authentication protocol;
means for performing a radio bearer-specific ciphering process;
means for generating for each ciphering process a count parameter comprising a cyclical sequence number and a hyperframe number which is incremented each time the cyclical sequence number completes one cycle;
and for each core network or authentication protocol:
means for initializing a first radio bearer of a session with a hyperframe number exceeding the highest hyperframe number used during the previous session, and for sending a value for enabling the radio network controller to determine the same hyperframe number; and
at the end of a session, storing at least part of the highest hyperframe number used during the session.

7. A terminal apparatus according to claim 6, wherein the terminal apparatus includes means for adding a new radio bearer to an existing session by selecting the highest one of the hyperframe numbers used during the session for the core network in question, incrementing the selected hyperframe number and using it for initializing the count parameter for the new radio bearer.

8. A terminal apparatus according to claim 6, wherein the terminal apparatus includes means for storing at least part of the core network-specific hyperframe number in its subscriber identity module.

9. A controller apparatus comprising:
means for performing a core network-specific authentication protocol in respect of a terminal apparatus in a radio access network which supports multiple radio bearers and is connected to at least two core networks;
means for performing a radio bearer-specific ciphering process;
means for generating for each ciphering process a count parameter comprising a cyclical sequence number and a hyperframe number which is incremented each time the cyclical sequence number completes one cycle;
and for each core network or authentication protocol:
an input from the terminal apparatus for a value for determining a hyperframe number exceeding the highest hyperframe number used during the previous session with that terminal apparatus, and to initialize a first radio bearer of a new session with a hyperframe number based on the received value.

10. A controller apparatus according to claim 9, wherein the controller apparatus includes means for adding a new radio bearer to an existing session by:
receiving from the terminal apparatus a second value for determining a hyperframe number exceeding the highest one of the hyperframe numbers used during the session, and
using the second received value for initializing the count parameter for the new radio bearer.

11. A terminal apparatus, wherein the terminal apparatus is configured to:
perform a core network-specific authentication protocol and a radio bearer-specific ciphering process;
generate for each ciphering process a count parameter comprising a cyclical sequence number and a hyperframe number which is incremented each time the cyclical sequence number completes one cycle;
and for each core network or authentication protocol:
initialize a first radio bearer of a session with a hyperframe number exceeding the highest hyperframe number used during the previous session, and send a value for enabling the radio network controller to determine the same hyperframe number; and at the end of a session, store at least part of the highest hyperframe number used during the session.

12. A terminal apparatus according to claim 11, wherein the terminal apparatus is further configured to add a new radio bearer to an existing session by, wherein the terminal apparatus is further configured to select the highest one of the hyperframe numbers used during the session for the core network in question, increment the selected hyperframe number and use it for initializing the count parameter for the new radio bearer.

13. A terminal apparatus according to claim 11, wherein the terminal apparatus is further configured to store at least part of the core network-specific hyperframe number in its subscriber identity module.

14. A controller apparatus, wherein the controller apparatus is configured to:

perform a core network-specific authentication protocol in respect of a terminal apparatus in a radio access network which supports multiple radio bearers and is connected to at least two core networks;

perform a radio bearer-specific ciphering process;

generate for each ciphering process a count parameter comprising a cyclical sequence number and a hyperframe number which is incremented each time the cyclical sequence number completes one cycle;

and for each core network or authentication protocol:

receive from the terminal apparatus a value for determining a hyperframe number exceeding the highest hyperframe number used during the previous session with that terminal apparatus, and initialize a first radio bearer of a new session with a hyperframe number based on the received value.

15. A controller apparatus according to claim 14, wherein the controller apparatus is further configured to add a new radio bearer to an existing session by, wherein the controller apparatus is further configured to:

receive from the terminal apparatus a second value for determining a hyperframe number exceeding the highest one of the hyperframe numbers used during the session, and use the second received value for initializing the count parameter for the new radio bearer.

* * * * *